(12) United States Patent
Thorailler

(10) Patent No.: US 9,897,736 B2
(45) Date of Patent: Feb. 20, 2018

(54) LIGHTING DEVICE HAVING LIGHT GUIDE WITH HELICALLY-SHAPED INPUT PORTIONS

(71) Applicant: Valeo Systemes Thermiques, Le Mesnil Saint Dénis (FR)

(72) Inventor: Maryline Thorailler, Le Mesnil Saint Dénis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 199 days.

(21) Appl. No.: 14/907,449

(22) PCT Filed: Jul. 24, 2014

(86) PCT No.: PCT/FR2014/000175
§ 371 (c)(1),
(2) Date: Jan. 25, 2016

(87) PCT Pub. No.: WO2015/011347
PCT Pub. Date: Jan. 29, 2015

(65) Prior Publication Data
US 2016/0178827 A1    Jun. 23, 2016

(30) Foreign Application Priority Data

Jul. 25, 2013 (FR) ...................... 13 01794

(51) Int. Cl.
*G02B 6/125* (2006.01)
*G02B 6/43* (2006.01)
(Continued)

(52) U.S. Cl.
CPC .......... *G02B 6/0006* (2013.01); *B60Q 3/283* (2017.02); *B60Q 3/64* (2017.02)

(58) Field of Classification Search
CPC ............ F21V 2200/13; F21V 2200/17; F21W 2101/08; F21S 48/2281; G02B 6/0008; G02B 6/008; G02B 6/4202; B60Q 3/283
See application file for complete search history.

(56) References Cited

U.S. PATENT DOCUMENTS 3,825,336 A * 7/1974 Reynolds ............... G03B 27/73
353/84
4,048,486 A * 9/1977 Kriege ..................... A61B 1/07
355/1
(Continued)

FOREIGN PATENT DOCUMENTS

DE    10 2004 047 653 A1    5/2005
FR    2 827 114              1/2003
(Continued)

OTHER PUBLICATIONS

International Search Report of the ISA for PCT/FR2014/000175 dated Oct. 7, 2014.
(Continued)

*Primary Examiner* — Ismael Negron
(74) *Attorney, Agent, or Firm* — Daly, Crowley, Mofford & Durkee, LLP

(57) ABSTRACT

The lighting device includes at least two light sources; at least two input guides coupled to the light sources; and a light collector coupled to the light-sensing guides. Each of the input guides has an input end facing the corresponding light source, and an output end tangentially coupled to the light collector such as to lead a light beam from the corresponding light source into the collector. The input guides are helically-shaped between the input and the output ends.

14 Claims, 1 Drawing Sheet

(51) Int. Cl.
*F21V 8/00* (2006.01)
*B60Q 3/64* (2017.01)
*B60Q 3/283* (2017.01)

(56) References Cited

U.S. PATENT DOCUMENTS

| | | | | |
|---|---|---|---|---|
| 4,932,747 | A * | 6/1990 | Russell | G02B 6/04 |
| | | | | 219/121.6 |
| 5,301,090 | A * | 4/1994 | Hed | F21V 9/10 |
| | | | | 362/101 |
| 5,555,161 | A | 9/1996 | Roe et al. | |
| 6,164,805 | A | 12/2000 | Hulse | |
| 6,341,876 | B1 * | 1/2002 | Moss | G02B 6/0006 |
| | | | | 362/243 |
| 6,385,371 | B1 * | 5/2002 | Li | G02B 6/2804 |
| | | | | 385/121 |
| 6,733,166 | B2 * | 5/2004 | Hulse | G02B 6/0005 |
| | | | | 362/33 |
| 7,237,927 | B2 * | 7/2007 | Coushaine | F21S 48/1159 |
| | | | | 362/235 |
| 7,850,334 | B2 * | 12/2010 | Holder | F21K 9/68 |
| | | | | 362/227 |
| 8,439,526 | B2 * | 5/2013 | Brusilovsky | F21S 6/003 |
| | | | | 362/231 |
| 9,562,663 | B2 * | 2/2017 | Gebauer | F21S 48/1329 |
| 2006/0062013 | A1 * | 3/2006 | Imade | G02B 27/0972 |
| | | | | 362/551 |
| 2006/0227568 | A1 | 10/2006 | Enders et al. | |
| 2007/0009210 | A1 | 1/2007 | Hulse | |
| 2008/0074865 | A1 | 3/2008 | Lutz et al. | |
| 2011/0273862 | A1 * | 11/2011 | Li | G02B 6/0008 |
| | | | | 362/19 |

FOREIGN PATENT DOCUMENTS

| | | |
|---|---|---|
| FR | 2 833 688 | 6/2003 |
| JP | 2005-331289 | 12/2005 |

OTHER PUBLICATIONS

International Written Opinion of the ISA for PCT/2014/000175 dated Oct. 7, 2014.
U.S. Appl. No. 14/907,446, filed Jan. 25, 2016, Thorailler, et al.
PCT Search Report of the ISA dated Oct. 29, 2014 for PCT/FR2014/000176; 3 pages.
PCT Written Opinion of the ISA dated Oct. 29, 2014 for PCT/FR2014/000176; 7 pages.

* cited by examiner

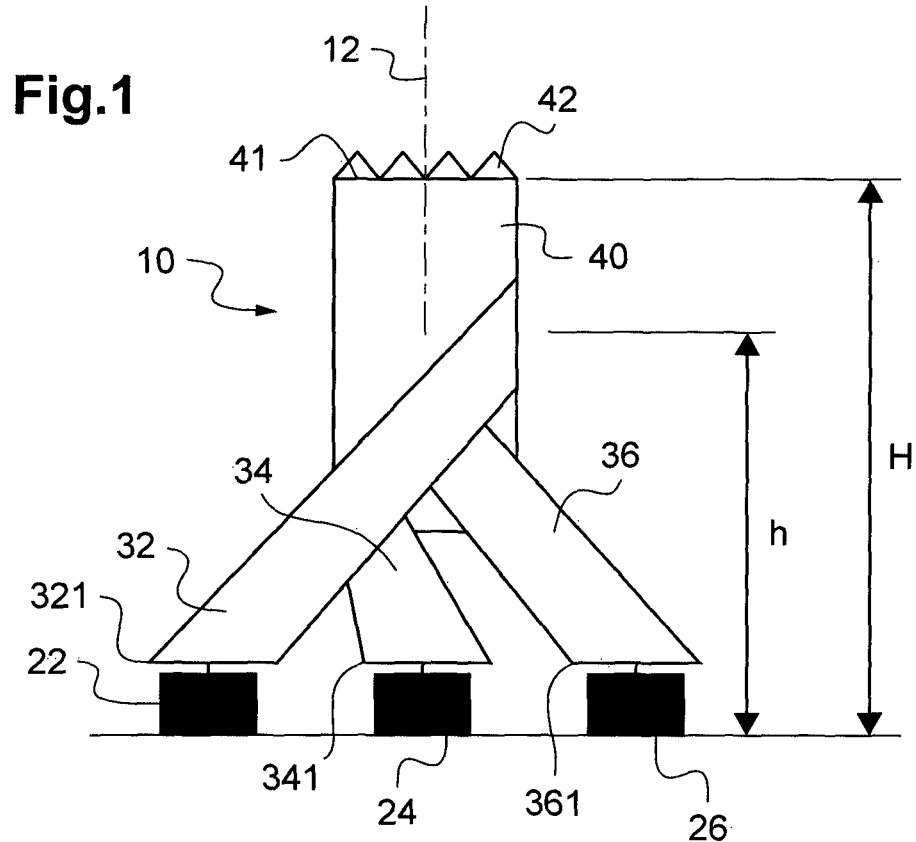
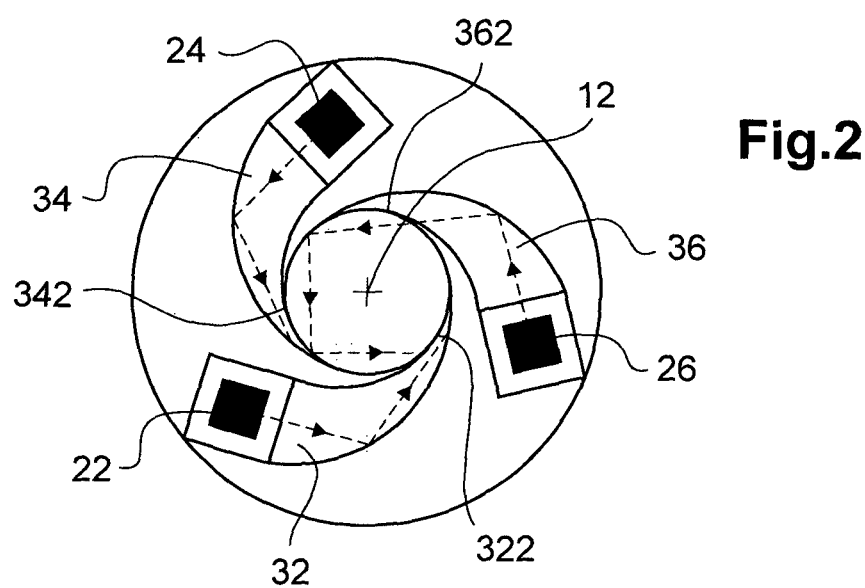

LIGHTING DEVICE HAVING LIGHT GUIDE WITH HELICALLY-SHAPED INPUT PORTIONS

CROSS REFERENCE TO RELATED APPLICATIONS

This application is a U.S. National Stage of PCT application PCT/FR2014/000175 filed in the French language on Jul. 24, 2014, and entitled "LIGHTING DEVICE," which claims priority to French application FR1301794 filed Jul. 25, 2013 which application is incorporated herein by reference.

The present invention relates to a lighting device, notably for a motor vehicle. The invention also relates to an illumination source comprising a lighting device according to the invention, as well as to a gear shift knob of a motor vehicle comprising a lighting device according to the invention.

The number of lighting devices present in the passenger compartment of a motor vehicle increases with the sophistication of the vehicle.

The most commonly used illumination sources are typically light-emitting diodes which are monochrome, with rather limited ranges of available colors. There are polychromatic light-emitting diodes, but these are usually extremely costly and offer little choice in terms of power.

There are devices based on a plurality of light sources of different colors, which can mix the beams emitted by these sources in an attempt to provide a beam having a desired color.

These devices use semi-reflective blades to mix the beams emitted by each light source. In addition to its high cost, the fragility and bulk of this type of device may be incompatible with use as an indicator light in a motor vehicle.

Finally, the beams produced with these types of device are usually non-uniform.

Thus there is a need to provide a lighting device which can produce a uniform mixture of at least two light beams, and whose cost, dimensions and robustness are compatible with use as an indicator light in a motor vehicle.

Thus the invention proposes a lighting device comprising:
at least two light sources,
at least two light capture guides associated with the light sources, each of the capture guides being associated with a separate light source, and
a light collector associated with the light capture guides, characterized in that
each of the capture guides comprises an input end placed facing the light source associated with it, and an output end penetrating tangentially into the light collector so as to convey a light beam emitted from the associated light source into the collector, and in that the capture guides have a helical shape between their input and output ends.

Advantageously, the configuration of the capture guides of the lighting device according to the invention makes it possible to produce uniform lighting in the light collector.

In particular, the helical shape of the capture guides makes it possible to increase the optical path of the light rays emitted from the light sources, while limiting the overall dimensions of the lighting device.

Furthermore, since the input ends of the capture guides penetrate into the collector tangentially, the coupling between these guides and the collector is greatly improved.

The device according to the invention may also have one or more of the following characteristics, considered individually or in all technically feasible combinations:

the collector comprises an input end into which the output ends of the capture guides penetrate, and an output end comprising a plurality of light dispersing elements; and/or the light collector comprises a cylindrical body of revolution; and/or the capture guides have a helical shape around the axis of the cylindrical body of the collector; and/or the light sources are equally distributed on a circle centered on the axis of the cylindrical body of the collector; and/or the capture guides all have substantially the same dimension along the axis of the cylindrical body; and/or $$H \geq \tfrac{1}{2} h,$$

where
H is the dimension of the lighting device along the axis of the cylindrical body, and h is the distance along the axis of the cylindrical body between the input and output ends of the light capture guides; and/or the device comprises at least three light sources, each associated with a separate capture guide; and/or each of the light sources comprises at least one light-emitting diode placed facing the associated light guide; and/or the light sources emit in wavelength ranges which are different from one another; and/or the angles of the helicoids forming the capture guides are substantially equal to one another and greater than or equal to 40° and less than or equal to 50°; and/or the light collector and the capture guides are made in one piece.

The invention also relates to an illumination source intended, notably, for a motor vehicle, comprising a lighting device according to the invention.

The invention also relates to a gear shift knob of a motor vehicle comprising a lighting device according to the invention.

The invention will be more readily understood on consideration of the following description which is provided for guidance only and without limiting intent, accompanied by the appended drawings:

FIG. 1 shows in a schematic manner a side view of a lighting device according to the invention, and FIG. 2 shows in a schematic manner a bottom view of the lighting device shown in FIG. 1, the lighting device being shown with the paths of light rays.

According to the embodiment shown in FIGS. 1 and 2, the invention relates to a lighting device 10 comprising three light sources 22, 24, 26, three light capture guides 32, 34, 36 and a light collector 40.

Each of the light capture guides is associated with a separate light source. Thus the light capture guide 32 is associated with the light source 22, the capture guide 34 is associated with the light source 24, and the capture guide 36 is associated with the light source 26.

Additionally, the light collector 40 is associated with all the light capture guides 32, 34 and 36.

Preferably, the light collector 40 is and the light capture guides 32, 34 and 36 are made in one piece and/or formed from a single material. Thus the light rays are propagated naturally by total reflection inside the capture guides 32, 34, 36 and the light collector 40, without any obstacle or separation between the walls which might impede the circulation of the light rays.

According to the embodiment of FIGS. 1 and 2, the lighting device 10 has a symmetry of revolution about an axis of symmetry 12.

The light sources 22, 24, 26 are preferably equally distributed on a circle which is perpendicular to the axis of symmetry 12 and has its center passing through the axis of symmetry 12. The light sources 22, 24, 26 preferably comprise one or more light-emitting diodes arranged, for example, on a backing of the PCB type, in particular a backing of the insulated metal substrate type. The light-emitting diode or diodes may be replaced by an equivalent light source, of the OLED, AOLED or FOLED type.

The lighting device according to the invention is particularly advantageous if the light sources 22, 24, 26 emit at different wavelengths from one another. For example, the light source 22 may emit at wavelengths corresponding to the color blue, the light source 24 may emit at wavelengths corresponding to the color red, and the light source 26 may emit at wavelengths corresponding to the color green.

As explained more fully below, the device according to the invention can be used to mix the light rays emitted from each of the light sources 22, 24, 26, and thus to provide a light beam having the desired color, resulting from the mixture of the light rays emitted by the different sources, at the output of the lighting device according to the invention.

Each of the light sources 22, 24, 26 is associated with a capture guide 32, 34, 36.

In particular, each of the light sources 22, 24, 26 is placed facing an input end 321, 341, 361 of a capture guide 32, 34, 36.

According to one embodiment, the input ends 321, 341, 361 of the capture guides 32, 34, 36 comprise at least one light dispersing element (not shown), in the form of at least one semicylindrical lens, for example. Advantageously, these dispersing elements can be used to increase the number of light rays emitted from each of the light sources 22, 24, 26 penetrating into each of the capture guides 32, 34, 36 via the input ends 321, 341, 360.

Each of the capture guides 32, 34, 36 also comprises, in addition to an input end, an output end 322, 342, 362. Each of the output ends 332, 342, 362 of the capture guides 32, 34, 36 penetrates tangentially into the light collector 40.

In other words, for each of the capture guides, the tangent to said capture guide at its output end is substantially parallel to the tangent of the light collector 40 in the area where said output end penetrates into the light collector.

As shown in FIG. 2, the capture guides 32, 34, 36 have a helical shape about the axis of symmetry 12 of the lighting device between their input ends 321, 341, 361 and their output ends 322, 342, 362.

Preferably, the angles of the helicoids forming the capture guides 32, 34, 36 are substantially equal to one another. Advantageously, this makes it possible to ensure that the light rays emitted from each of the light sources 22, 24, 26 are propagated through the capture guides 32, 34, 36 in a substantially identical manner. Advantageously, this makes it possible to obtain greater uniformity of the mixture of light rays at the output of the lighting device according to the invention.

In order to limit the losses of light rays during their propagation in the light capture guides, the angles of the helicoids forming the capture guides 32, 34, 36 are preferably greater than or equal to 40° and less than or equal to 40°. Thus, as shown in FIG. 2, the light rays emitted from the light sources 22, 24, 26 are propagated from the input ends 321, 341, 346 of the capture guides toward the output ends 322, 342, 362 by total reflection on the walls of said capture guides 32, 34, 36. Although the capture guides are shaped so as to allow total reflection of the light rays propagated inside said capture guides, some light rays may not be totally reflected, in particular because of the surface state of the capture guides.

As shown in FIG. 1, the light capture guides 32, 34, 36 are associated with the light collector 40. In particular, the output ends 322, 342, 362 of the capture guides penetrate into the light collector 40 at the input end of said light collector 40.

The light collector 40 comprises, in addition to an input end, an output end 41. The output end 41 of the light collector 40 may comprise a plurality of light dispersing elements 42, in the form of semicylindrical lenses, for example.

Advantageously, these light dispersing elements 42 can be used to disperse the light leaving the light collector 40, thus making the distribution of the light leaving the lighting device 10 more uniform.

The light collector 40 preferably has a symmetry of revolution about the axis of symmetry 12 of the lighting device. For example, as shown in FIGS. 1 and 2, the light collector 40 comprises a cylindrical body of revolution about the axis of symmetry 12 of the lighting device 10.

As shown in FIG. 1, the light capture guides 32, 34, 36 all have substantially the same dimension along the axis of symmetry 12. In other words, each of the light capture guides 32, 34, 36 penetrates into the light collector 40 at substantially the same height h. Advantageously, this configuration can provide good uniformity between the light rays emitted from the various light sources 22, 24, 26. This is because all the light rays emitted from the different light sources 22, 24, 26 thus travel over substantially the same distance inside the different light capture guides 32, 34, 36 before they penetrate, at substantially the same angle, into the light collector 40.

According to a preferred embodiment of the invention, the dimension H of the lighting device along the axis of symmetry 12 is greater than or equal to 3/2*h, where h is the distance along the axis of symmetry 12 between the input ends 321, 341, 361 and output ends 322, 342, 362 of the light capture guides 32, 34, 36.

For the most common applications, particularly in the context of a motor vehicle, the dimension H of the device according to the invention is about 15 mm, and the distance h along the axis of symmetry 12 between the input ends 321, 341, 361 and output ends 322, 342, 362 of the light capture guides 32, 34, 36 is about 10 mm.

Thus the lighting device according to the invention makes it possible, particularly because of the helical shape of the capture guides, to increase the optical path of the light rays emitted from the light sources 22, 24, 26, while retaining small overall dimensions of the lighting device.

Finally, it is evident that numerous adaptations of the lighting device 10 according to the invention described in detail above may be introduced, while retaining at least some of the advantages of the invention. In particular, the number of light sources and capture guides is not limited to three as in the example described in detail with reference to FIGS. 1 and 2. Typically, the lighting device according to the invention may comprise two light sources associated with two capture guides.

The invention claimed is:

1. A lighting device comprising:
   at least two light sources,
   at least two light capture guides associated with the light sources, each of the light capture guides being associated with a separate light source, and
   a light collector associated with the light capture guides, characterized in that
each of the light capture guides comprises an input end placed facing the light source associated with it, and an output end penetrating tangentially into the light collector so as to convey a light beam emitted from the associated light source into the light collector, and in that
the light capture guides have a helical shape between their input and output ends.

2. The lighting device as claimed in claim 1, wherein the light collector comprises an input end into which the output ends of the light capture guides penetrate, and an output end comprising a plurality of light dispersing elements.

3. The lighting device as claimed in claim 1, comprising at least three light sources, each associated with a separate light capture guide.

4. The lighting device as claimed in claim 1, wherein each of the light sources comprises at least one light-emitting diode placed facing the associated light capture guide.

5. The lighting device as claimed in claim 1, wherein the light sources emit in wavelength ranges which are different from one another.

6. The lighting device as claimed in claim 1, wherein the angles of the helicoids forming the light capture guides are substantially equal to one another and greater than or equal to 40° and less than or equal to 50°.

7. The lighting device as claimed in claim 1, wherein the light collector and the light capture guides are made in one piece.

8. An illumination source comprising a lighting device as claimed in claim 1.

9. A gear shift knob of a motor vehicle comprising a lighting device as claimed in claim 1.

10. The lighting device as claimed in claim 1, wherein the light collector comprises a cylindrical body of revolution.

11. The lighting device as claimed in claim 10, wherein the light capture guides have a helical shape around the axis of the cylindrical body of the light collector.

12. The lighting device as claimed in claim 10, wherein the light sources are equally distributed on a circle centered on the axis of the cylindrical body of the light collector.

13. The lighting device as claimed in claim 10, wherein the light capture guides all have substantially the same dimension along the axis of the cylindrical body.

14. The lighting device as claimed in claim 13, wherein $$H \geq \frac{3}{2}h,$$

where
H is the dimension of the lighting device along the axis of the cylindrical body, and
h is the distance along the axis of the cylindrical body between the input and output ends of the light capture guides.

* * * * *